United States Patent
Kalamatianos et al.

(10) Patent No.: US 11,023,242 B2
(45) Date of Patent: Jun. 1, 2021

(54) METHOD AND APPARATUS FOR ASYNCHRONOUS SCHEDULING

(71) Applicants: Advanced Micro Devices, Inc., Sunnyvale, CA (US); ATI Technologies ULC, Markham (CA)

(72) Inventors: John Kalamatianos, Boxborough, MA (US); Greg Sadowski, Boxborough, MA (US); Syed Zohaib M. Gilani, Markham (CA)

(73) Assignees: ATI TECHNOLOGIES ULC, Markham (CA); ADVANCED MICRO DEVICES, INC., Sunnyvale, CA (US)

(*) Notice: Subject to any disclaimer, the term of this patent is extended or adjusted under 35 U.S.C. 154(b) by 0 days.

(21) Appl. No.: 15/417,555

(22) Filed: Jan. 27, 2017

(65) Prior Publication Data

US 2018/0217844 A1    Aug. 2, 2018

(51) Int. Cl.
*G06F 9/38*  (2018.01)
*G06F 9/30*  (2018.01)
*G06F 15/80*  (2006.01)
*G06F 12/0875*  (2016.01)

(52) U.S. Cl.
CPC .......... *G06F 9/3836* (2013.01); *G06F 9/3001* (2013.01); *G06F 9/30036* (2013.01); *G06F 9/383* (2013.01); *G06F 9/384* (2013.01); *G06F 9/3824* (2013.01); *G06F 9/3851* (2013.01); *G06F 9/3871* (2013.01); *G06F 9/3877* (2013.01); *G06F 9/3887* (2013.01); *G06F 12/0875* (2013.01); *G06F 15/8007* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 4,926,317 A | * | 5/1990 | Wallach | G06F 12/1045 708/520 |
| 5,574,939 A | * | 11/1996 | Keckler | G06F 9/30032 712/200 |
| 5,745,726 A | * | 4/1998 | Shebanow | G06F 9/3836 712/214 |
| 2012/0066483 A1 | * | 3/2012 | Boury | G06F 12/0875 712/233 |
| 2014/0215189 A1 | * | 7/2014 | Airaud | G06F 9/30014 712/208 |
| 2015/0100758 A1 | * | 4/2015 | Rogers | G06F 9/3887 712/22 |

\* cited by examiner

*Primary Examiner* — John M Lindlof
(74) *Attorney, Agent, or Firm* — Volpe Koenig

(57) ABSTRACT

A method and apparatus of asynchronous scheduling in a graphics device includes sending one or more instructions from an instruction scheduler to one or more instruction first-in/first-out (FIFO) devices. An instruction in the one or more FIFO devices is selected for execution by a single-instruction/multiple-data (SIMD) pipeline unit. It is determined whether all operands for the selected instruction are available for execution of the instruction, and if all the operands are available, the selected instruction is executed on the SIMD pipeline unit. The self-timed arithmetic pipeline unit (SIMD pipeline unit) is effectively encapsulated in a synchronous, (e.g., clocked by global clock), scheduler and register file environment.

20 Claims, 6 Drawing Sheets

METHOD AND APPARATUS FOR ASYNCHRONOUS SCHEDULING

STATEMENT REGARDING FEDERALLY SPONSORED RESEARCH

This invention was made with Government support under (FastForward-2 Node Architecture (NA) Project with Lawrence Livermore National Laboratory (Prime Contract No. DE-AC52-07NA27344, Subcontract No. B609201)) awarded by DOE. The Government has certain rights in this invention.

BACKGROUND

In massively multithreaded machines that employ a single instruction-multiple thread (SIMT) execution model, such as graphics processing units (GPUs), vector arithmetic instructions are scheduled on a vector arithmetic logic unit (VALU) having a deterministic execution latency. The execution latency is defined by the number of pipeline stages needed to complete the worst-case latency vector operation, (e.g., executing on a synchronous vector ALU). This latency also determines the bypass path latency for executing dependent instructions back to back. In essence, this latency defines the peak computational throughput of the machine for a chain of dependent vector arithmetic instructions from the same thread or group of threads, (i.e., wavefront).

BRIEF DESCRIPTION OF THE DRAWINGS

A more detailed understanding can be had from the following description, given by way of example in conjunction with the accompanying drawings.

DETAILED DESCRIPTION

Although a more detailed description follows, briefly a technique that reduces dependency of the peak throughput to the worst-case execution latency of vector arithmetic instructions while at the same time reducing the power and area of a vector arithmetic logic unit (ALU) is described herein. A self-timed, (i.e., asynchronous), ALU pipeline into a synchronous single-instruction/multiple-data (SIMD) pipeline unit is disclosed. The set of interface logic and circuits that enable communications between the asynchronous ALU and the synchronous vector register file (VRF) and instruction scheduler blocks are further described herein. Accordingly, an instruction scheduler operating in the synchronous domain can issue instructions to an asynchronous, variable latency ALU.

A method of asynchronous scheduling in a graphics device is disclosed. The method includes sending one or more instructions from an instruction scheduler to one or more instruction first-in/first-out (FIFO) devices. An instruction in the one or more FIFO devices is selected by an instruction picker for execution by a SIMD pipeline unit. It is determined whether all operands for the selected instruction are available for execution of the instruction, and if all the operands are available, the selected instruction is executed on the SIMD pipeline unit.

An apparatus is disclosed. The apparatus includes a VRF, an instruction scheduler, one or more FIFO devices operatively coupled to the instruction scheduler, one or more operand caches operatively coupled to the VRF, an instruction picker operatively coupled to the one or more operand caches and the one or more instruction FIFO devices, and a SIMD pipeline unit. The instruction scheduler sends one or more instructions to the one or more FIFO devices. The instruction picker selects an instruction in the one or more instruction FIFO devices for execution by the SIMD pipeline unit based upon one or more criteria including determining whether all operands for the selected instruction are available for execution of the instruction.

A non-transitory computer-readable medium having instructions recorded thereon, that when executed by a computing device, cause the computing device to perform operations is disclosed. The operations include sending one or more instructions from an instruction scheduler to one or more FIFO devices. An instruction in the one or more FIFO devices is selected for execution by a SIMD pipeline unit. It is determined whether all operands for the selected instruction are available for execution of the instruction, and if all the operands are available, the selected instruction is executed on the SIMD pipeline unit.

Figure 1:
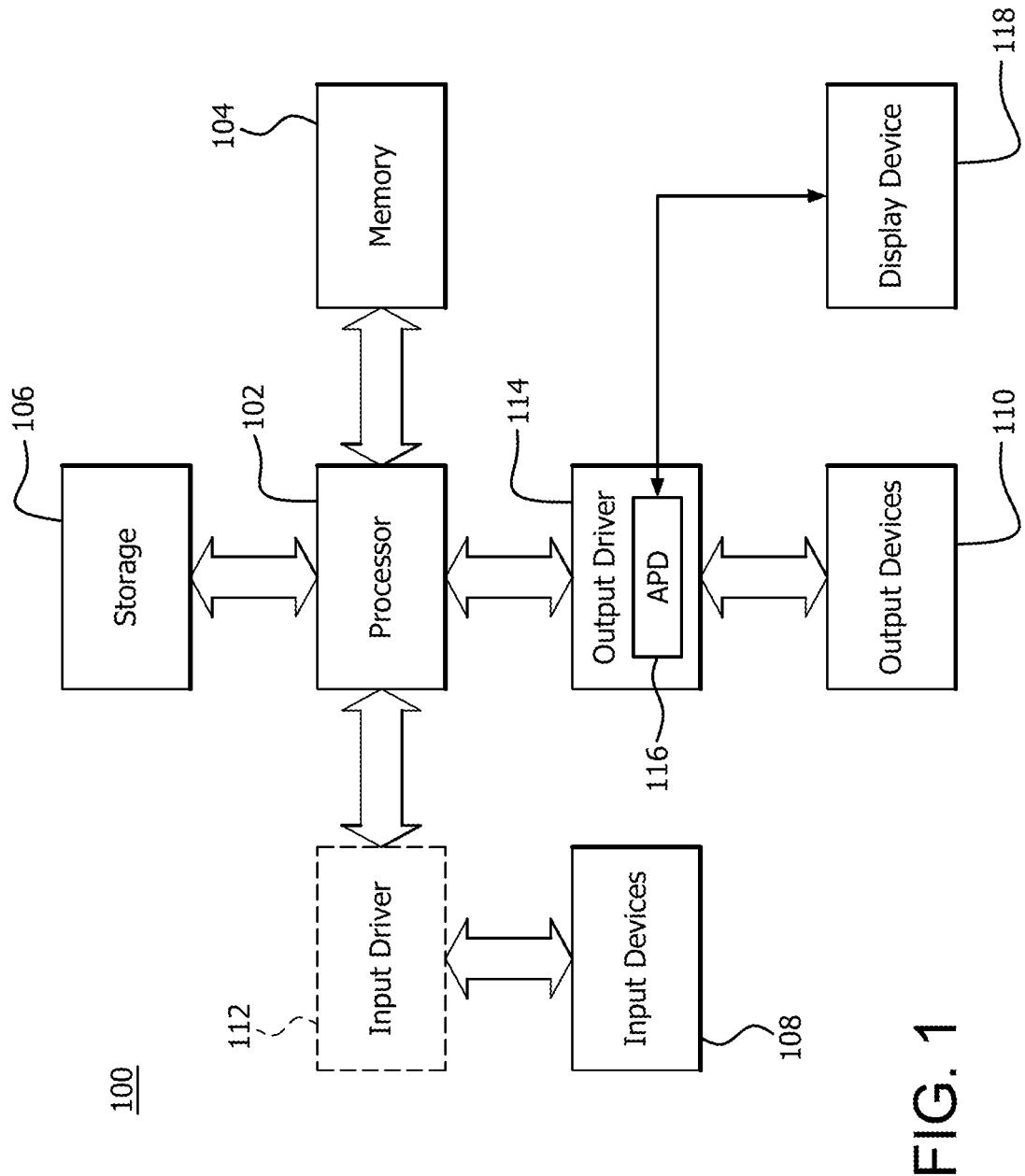
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes input drivers 112 and output drivers 114 that drive input devices 108 and output devices 110, respectively. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input drivers 112 communicate with the processor 102 and the input devices 108, and permit the processor 102 to receive input from the input devices 108. The output drivers 114 communicate with the processor 102 and the output devices 110, and permit the processor 102 to send output to the output devices 110. The output drivers 114 include an accelerated processing device (APD) 116 which is coupled to a display device 118. The APD 116 is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2A:
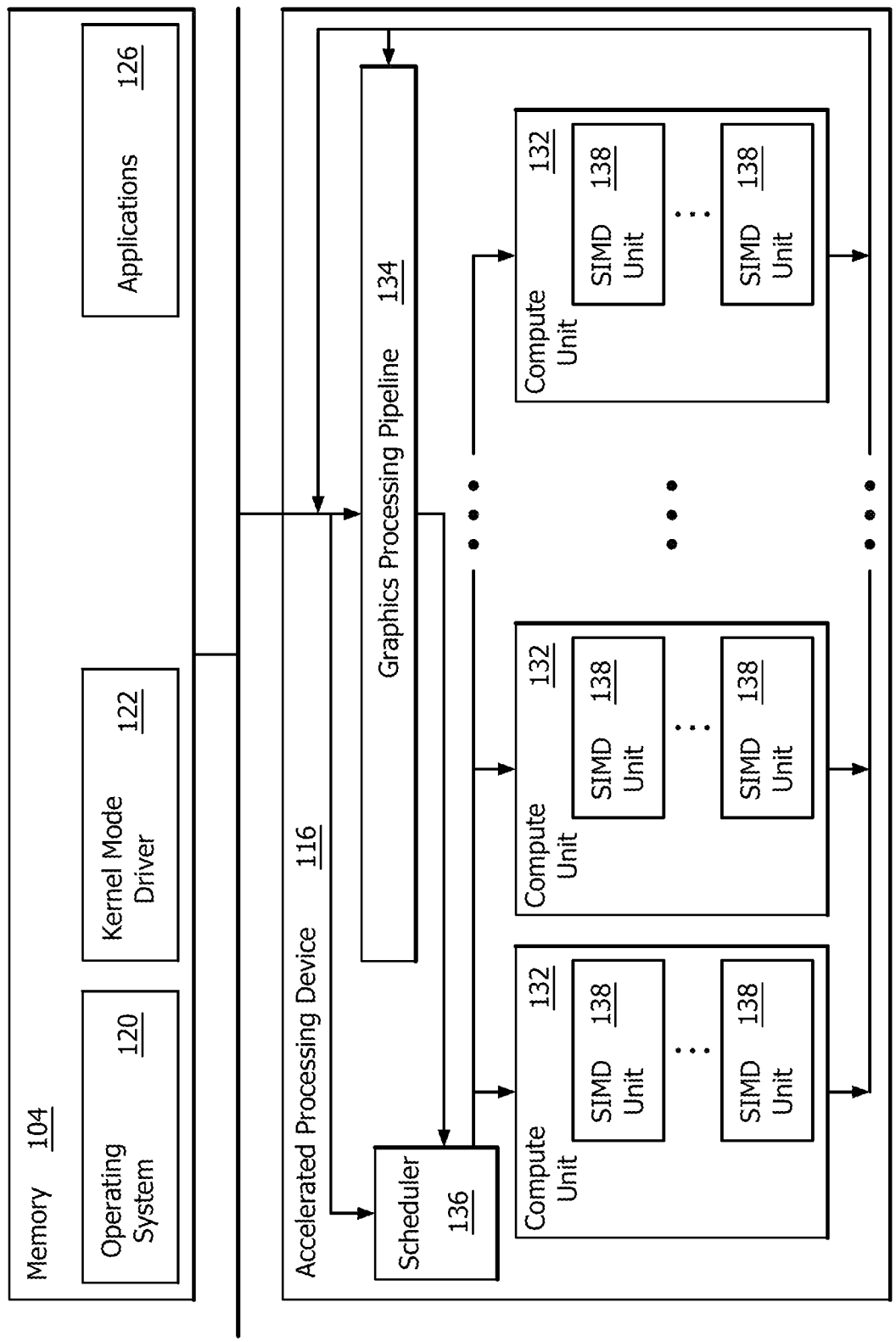
FIG. 2A is a block diagram of an accelerated processing device, according to an example.

FIG. 2A is a block diagram of an accelerated processing device 116, according to an example. The processor 102 maintains, in system memory 104, one or more control logic modules for execution by the processor 102. The control logic modules include an operating system 120, a driver 122, and applications 126. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related (or not related) to graphics operations, such as operations related to video, physics simulations, computational fluid dynamics, or other tasks, based on commands that are received from the processor 102 or that are not part of the "normal" information flow of a graphics processing pipeline 134.

The APD 116 includes compute units (e.g., shader engines) 132 (which may collectively be referred to herein as "programmable processing units") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in shader engines 132 is a work-item. Each work-item represents a single instantiation of a program that is to be executed serially in a particular lane. A group of work-items that can be executed simultaneously in a lock step fashion is called a "wavefront". Multiple wavefronts may be formed in a "work group," based on the collection of work-items designated to execute the same program. A work group can be executed by executing each of the wavefronts that make up the work group. Each wavefront may be executed on a single SIMD unit 138. A scheduler 136 is configured to perform operations related to scheduling various wavefronts on different shader engines 132 and SIMD units 138. Scheduling involves assigning wavefronts for execution on SIMD units 138, determining when wavefronts have ended, determining when wavefronts have stalled and should be swapped out with other wavefronts, and performing other scheduling tasks.

The parallelism afforded by the shader engines 132 is suitable for graphics related operations such as pixel value calculations, vertex transformations, and other graphics operations. A graphics processing pipeline 134 which accepts graphics processing commands from the processor 102 thus provides computation tasks to the shader engines 132 for execution in parallel.

The shader engines 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs") that define such computation tasks to the APD 116 for execution.

Figure 2B:
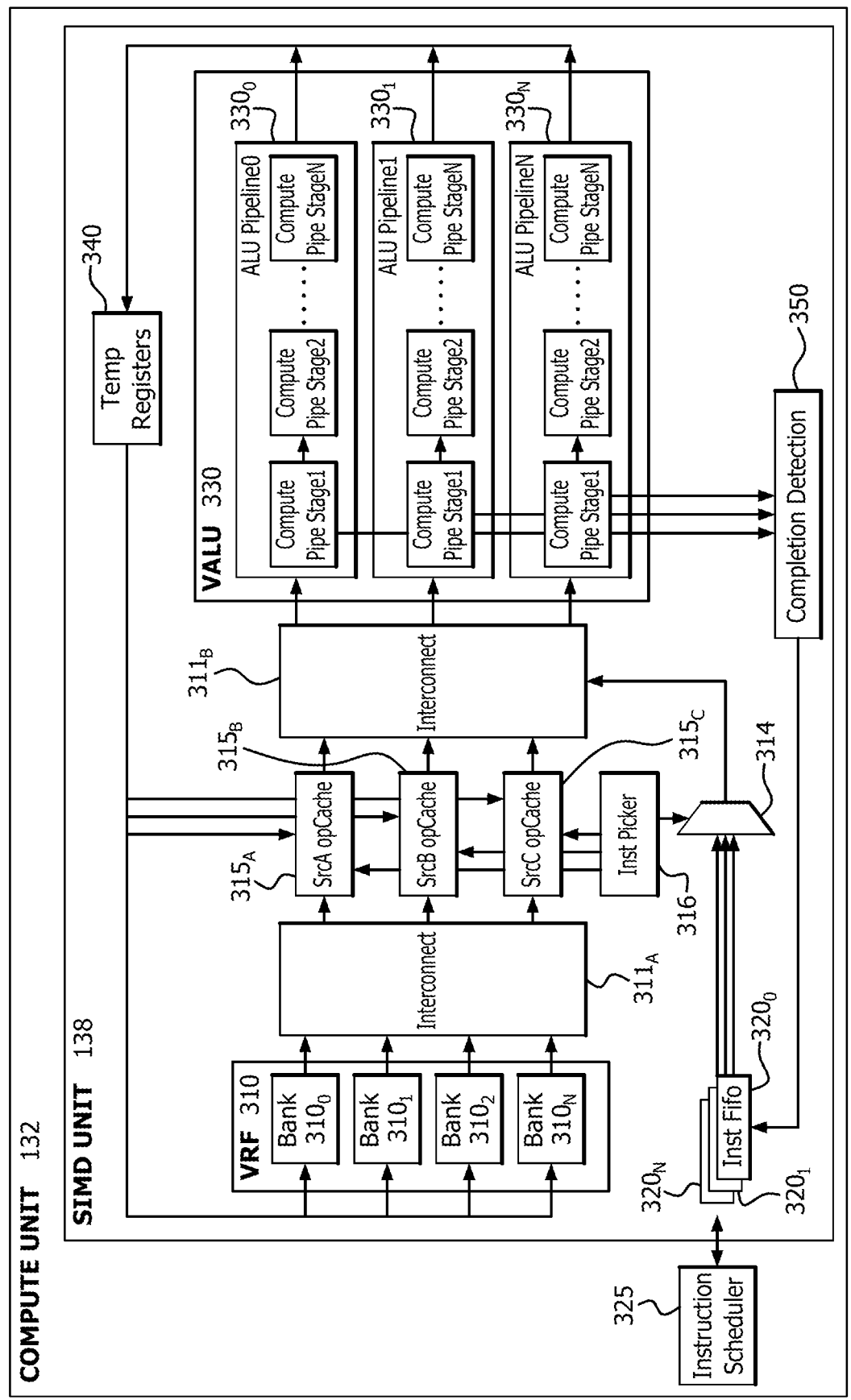
FIG. 2B is a block diagram of a compute unit of FIG. 2A, according to an example.

FIG. 2B is a block diagram of an example compute unit 132 of FIG. 2A. The compute unit 132 includes its own synchronous instruction scheduler 325 for issuing instructions for execution on any one of the SIMD units 138. Although the compute unit 132 includes multiple SIMD units 138, for purposes of example, only one of the SIMD units 138 is shown and described in further detail in FIG. 2B. Additionally, although the various components described in FIG. 2B and their functions are described in further detail below, briefly the SIMD unit 138 depicted in FIG. 2B includes a vector register file (VRF) 310 that includes a plurality of VRF banks (designated $310_0$, $310_1$, $310_2$, ..., $310_N$), which contain the values of source operands, (e.g., srcA, srcB, and srcC), for use in calculations that can be received, for example, from other memory locations in the system 100 when a program such as a graphics rendering program is executed or are received from a SIMD pipeline unit (i.e., a vector arithmetic logic unit (VALU) 330) of the SIMD unit 138, interconnects 311, (designated crossbar $311_A$ and $311_B$), to receive inputs from a plurality of components that require an ability to send information contained in them to one or more additional components, a plurality of operand Caches (opCaches) 315 for temporarily storing operands for and during calculations, (designated srcA opCache $315_A$, srcB opCache $315_B$, and srcC opCache $315_C$), an instruction picker 316 which selects instructions for execution on the SIMD pipeline unit, (i.e., VALU 330) of the SIMD unit 138, instruction FIFO devices (instruction FIFOs) 320 (designated InstFIFO $320_0$, InstFIFO $320_1$, ..., InstFIFO $320_N$) which receive and store instructions for execution on the VALU 330, temporary registers 340 for storing temporary computational values received from the VALU 330 lanes, (designated ALU Pipeline0 $330_0$, ALU Pipeline1, $330_1$, . . . , ALU PipelineN $330_N$), where each ALU Pipeline includes Compute Stages 1-N to process instructions, and a completion detection device 350, which detects completion of calculations on the VALU 330 to aid in allowing new instructions to be processed by the VALU 330.

Since the values of the source operands that are stored in the multiple banks of the VRF 310 need to be distributed to more than one destination location, such as the opCaches 315 associated with each source operand index, it is necessary to provide an interconnect, (i.e., $311_A$), to switch/route the information from various source locations to the destination locations. Similarly, since the values that the opCaches 315 will store, and related metadata that the InstFIFOs 320 will store, have multiple destinations (i.e., ALU Pipeline0 $330_0$, ALU Pipeline1 $330_1$, . . . , ALU PipelineN $330_N$), an additional interconnect $311_B$ is used to provide switching/routing from the multiple sources to the multiple destinations. Additionally, a multiplexer (Mux) 314 is shown to multiplex signals, (e.g., an instruction command and destination tag), coming from the InstFIFOs 320 to the interconnect $311_B$, for execution on the lanes of the VALU 330, since only a single instruction may need to be sent to the VALU 330 at any point. It should be understood that the interconnects 311 can be any type of circuit or logic to provide such switching and routing, but for purposes of example described below are referred to as crossbars. Additionally, although a multiplexer is shown as mux 314, as well as additional multiplexers that are utilized for similar purposes below, it should be understood that any circuitry or logic to provide such functionality can be utilized in place of muxes described above and in the examples described below.

Figure 3:
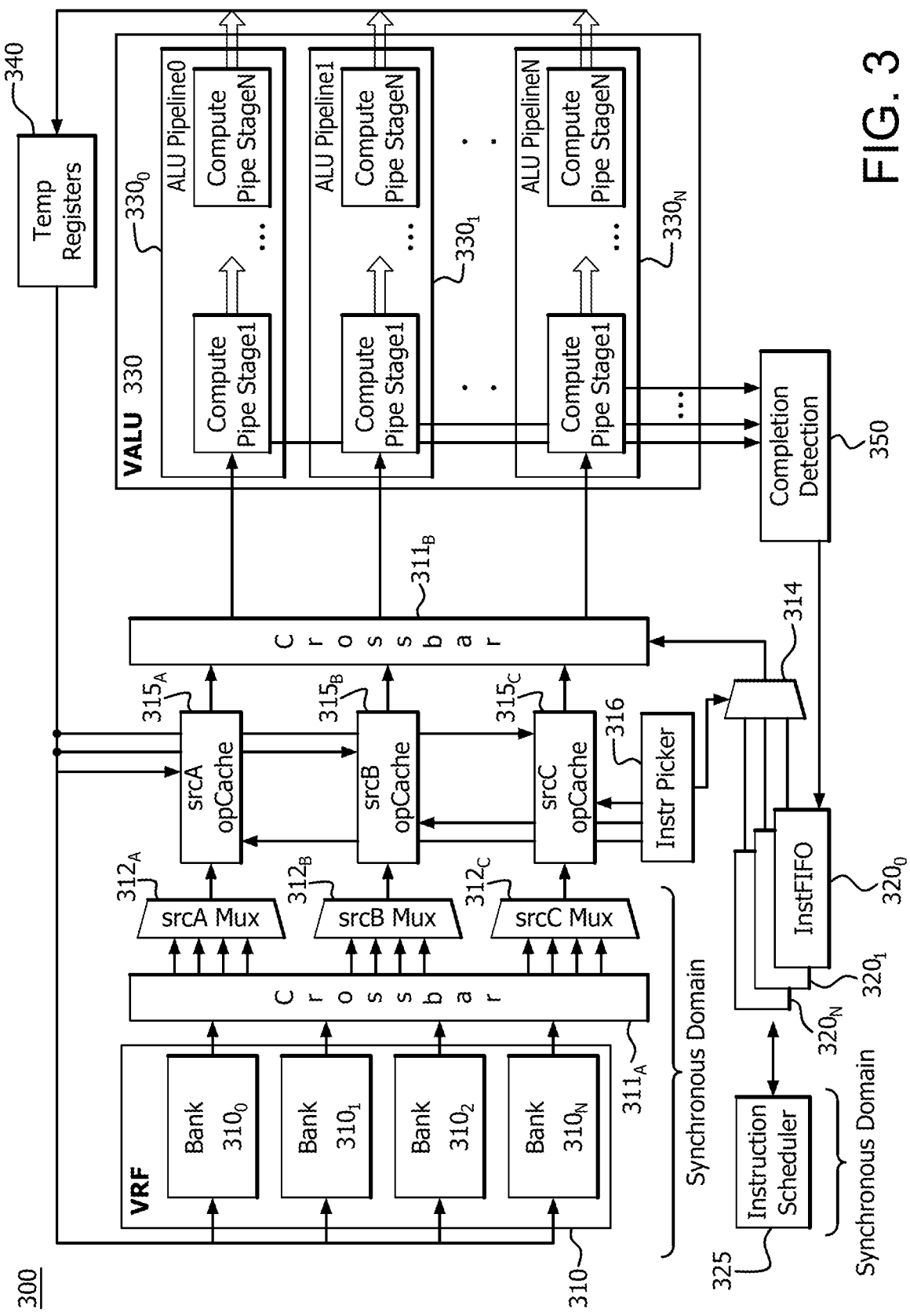
FIG. 3 is a block diagram of an example apparatus including a vector register file (VRF) coupled with a single-instruction, multiple data (SIMD) pipeline unit.

FIG. 3 is a block diagram of an example apparatus 300 including a VRF 310 coupled with a SIMD pipeline unit, (e.g., VALU 330) via additional logic to be described below. Although the apparatus 300 includes a number of components similar to those described in FIG. 2B, for purposes of example, those components are also laid out in the following description for convenience. For example, the apparatus 300 includes a plurality of VRF banks, (designated $310_0$, $310_1$, $310_2$, . . . , $310_N$), which contain source operands for use in calculations, (e.g., srcA, srcB, and srcC), crossbars 311, (designated crossbar $311_A$ and $311_B$), which receive inputs from a plurality of components for transmission to one or more additional components, a plurality of source multiplexers (Muxes designated srcA Mux $312_A$, srcB Mux $312_B$, and srcC Mux $312_C$), and a Mux 314 that receives instructions for sending to the SIMD pipeline unit. That is, Mux 314 sends the instruction opcode and the destination register tag which is used to index the particular opCache 315 when the destination data has been generated, as described below. It should also be noted that source operands could potentially be received from additional memory areas (not shown) if required by a program executing on the compute unit 132.

The crossbars 311 in the example apparatus 300 operate as interconnects described above in that they direct operand values coming from the VRF banks in VRF 310 ultimately to one or more of VALU 330 ALU Pipeline lanes $330_0$, $330_1$, . . . , $330_N$ for use in calculations during processing/execution. Additionally, the muxes 312 direct the operand values coming from any of the banks of the VRF 310 ultimately to the VALU 330 ALU lane inputs as well, via the crossbars 311 and opCaches 315 to be used as the srcA, srcB or srcC operand values in an associated computation. Accordingly, the apparatus 300 also includes a plurality of opCaches 315 for temporarily storing operand values for and during calculations, (designated srcA opCache $315_A$, srcB opCache $315_B$, and srcC opCache $315_C$), which store operand values from the banks of the VRF 310 and destination operand values as they are generated from the asynchronous SIMD pipeline unit, (i.e., VALU 330), so that they can be forwarded to dependent instructions (e.g., residing in the InstFIFOs 320), to avoid the need to wait for the operand values to be written back to the VRF 310 and read from it, which is dependent upon on clock edges since the VRF 310 is operating in the synchronous domain. Also included are an instruction picker 316, which selects instructions for execution/processing on the SIMD pipeline unit, instruction FIFOs 320 which receive and store instructions for execution on the SIMD pipeline unit, (designated InstFIFO $320_0$, InstFIFO $320_1$, . . . , InstFIFO $320_N$), an instruction scheduler 325, (which for purposes of example is substantially similar to scheduler 136 except as noted above it is for synchronous scheduling within a particular compute unit 132), VALU 330 which includes ALU Pipeline Lanes designated $330_0$, $330_1$, . . . , $330_N$, and which in turn each include compute pipe stage1, . . . , compute pipe stageN. The number of ALU lanes determines a number of threads per vector instruction that can execute in parallel. As described, each lane corresponds to a row of compute pipe stages in FIG. 3. Each ALU lane includes multiple pipeline stages to allow for high frequency of execution. Additionally, the example apparatus 300 includes temporary registers 340 for storing temporary computational values received from the SIMD pipeline unit during calculations. Although further detail is provided below, briefly the temporary registers hold operand values, (e.g., destination operand values), across all lanes for a single instruction as they are received from each ALU Pipeline. The destination operand values are generated in different points in time because the SIMD pipeline unit is processing asynchronously. The example apparatus further includes a completion detection device 350, which detects completion of calculations on the SIMD pipeline unit to aid in allowing new instructions to be processed by the SIMD pipeline unit. Components $311_B$, 314, 315, 316, 320, 330, 340 and 350 operate in a self-timed mode, (i.e., asynchronously). That is, they do not operate from a global clock (not shown), while the remaining components operate from the global clock, (i.e., synchronously).

Figure 4:
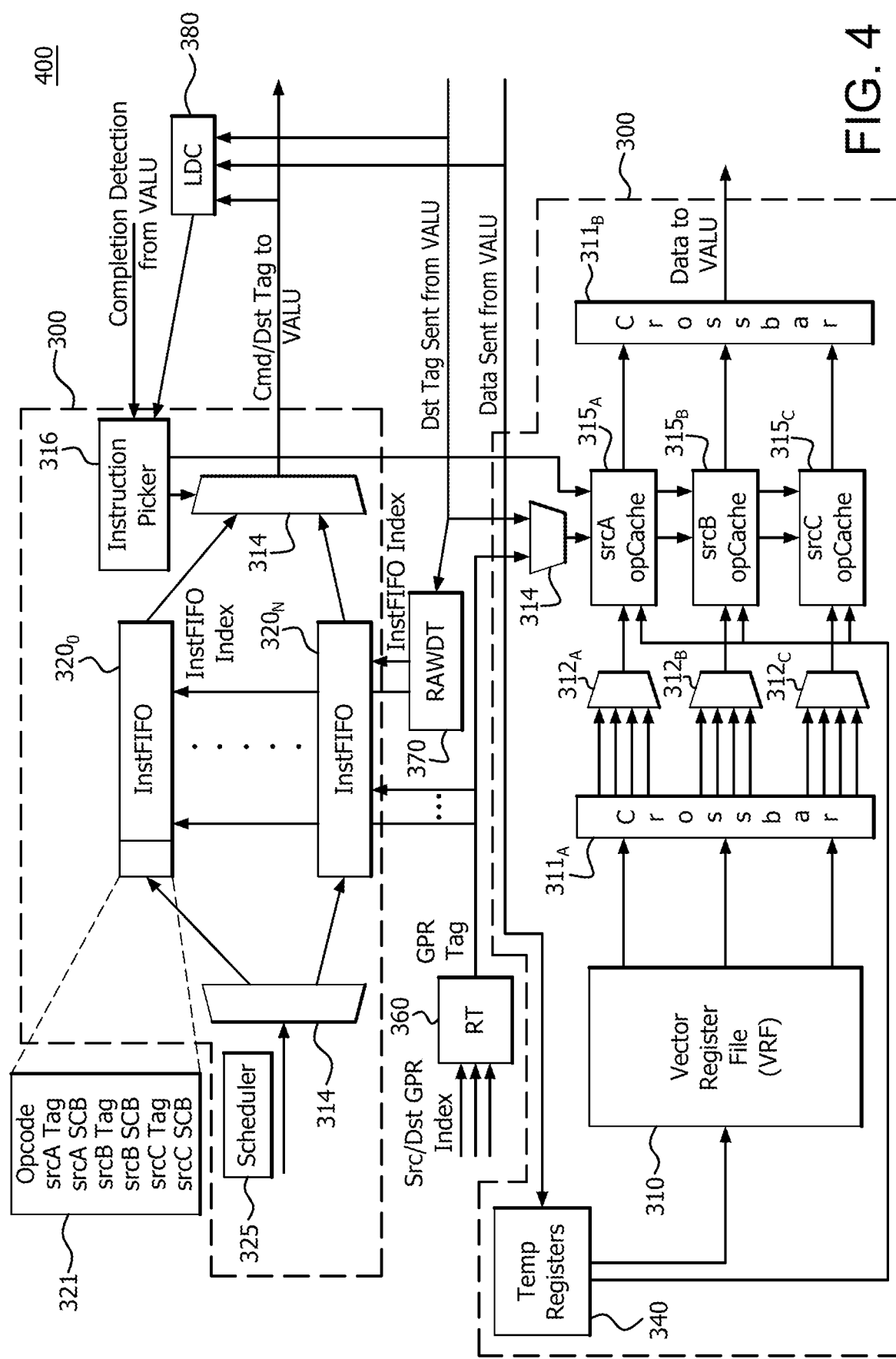
FIG. 4 is a block diagram of example issue/execution logic operating in the example apparatus of FIG. 3.

FIG. 4 is a block diagram of example issue/execution logic 400 operating in the example apparatus 300 of FIG. 3. For purposes of example, a plurality of components included in apparatus 300, are shown in FIG. 4. The example issue/execution logic 400 in one example is a circuit that interfaces with both the synchronous components of apparatus 300 and the asynchronous components of apparatus 300. Coupled with various components of apparatus 300, the logic 400 includes Muxes 314, an InstFIFO entry block 321 in association with each InstFIFO 320 entry that includes the operand for an instruction, which defines the type of operation to be executed by that instruction, a tag for each source operand as well as a scoreboard (SCB) bit which identifies if the operand is the latest operand value, a rename table (RT) block 360, a read-after-write dependency table (RAWDT) block 370, and a lane divergence counter (LDC) block 380, which are described in further detail below. It should be noted that communication between the asynchronous and synchronous domains occurs using "handshaking communication protocol." Additionally, the number of ALU pipeline lanes the VALU 330 can be referred to as the SIMD width. That is, every vector instruction has a number of threads equal to the wavefront size. A SIMD compute pipeline, (i.e., VALU 330), executes a thread on a single lane, (e.g., ALU Pipeline0). So the number of lanes can be more, equal or less than the wavefront size. Temporary register 340 is controlled by instruction picker 316 based upon feedback from the LDC block 380. The operation of the components is described in further detail below.

Figure 5:
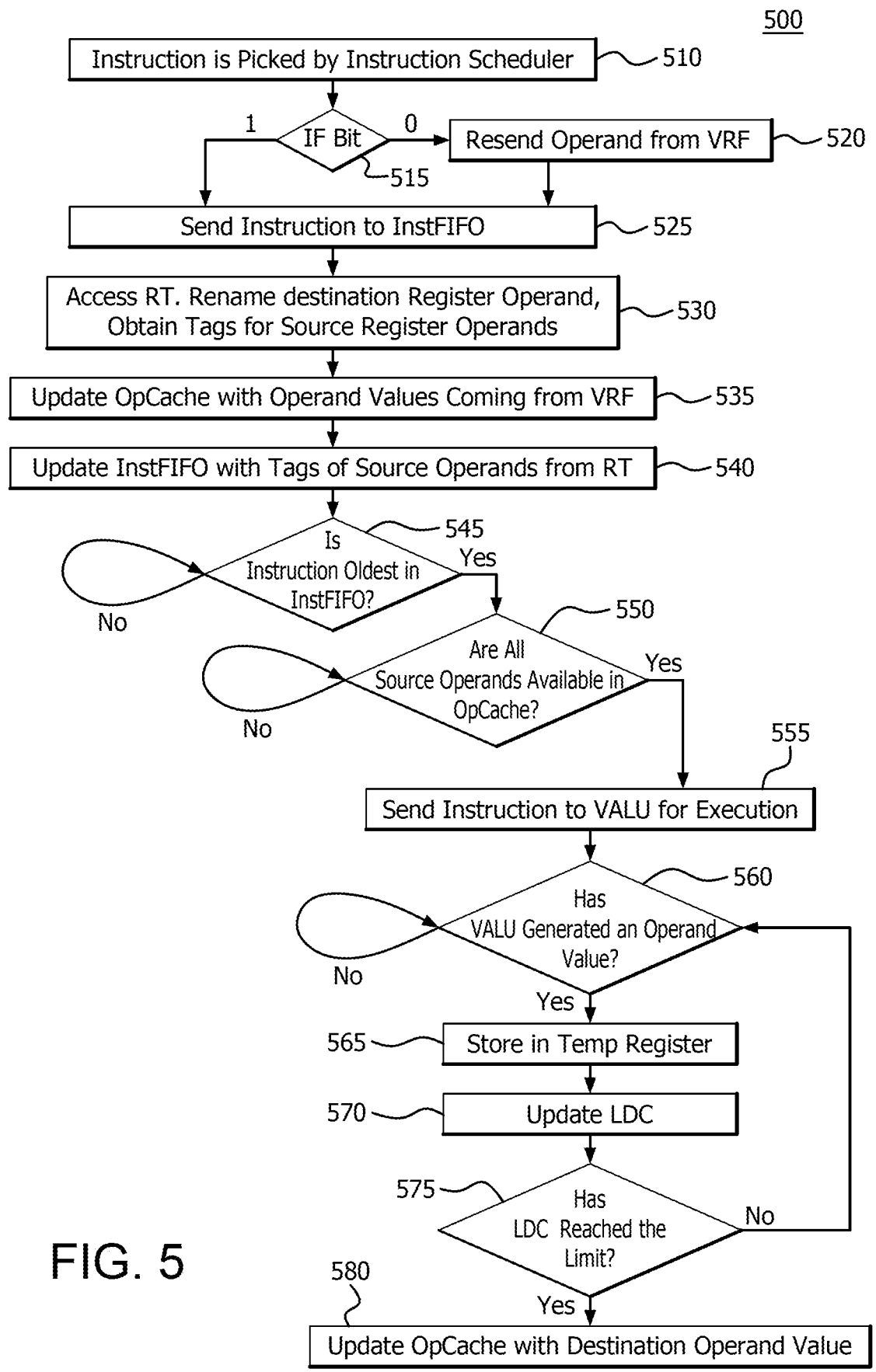
FIG. 5 is a flow diagram of an example method of scheduling asynchronous execution.

FIG. 5 is a flow diagram of an example method 500 of scheduling asynchronous execution. For purposes of example, various aspects of the description of example method 500 refer back to components described in example apparatus 300 and example logic 400. In step 510, an instruction that has been sent to one of the compute units 132 is picked by the instruction scheduler 325 for execution. Each general purpose register (GPR) such as the VRF 310 is marked with a bit, (e.g., an In-Flight (IF) bit), that indicates if the register holds the latest value. If the IF bit equals 1, for example, then the value in the VRF 310 is considered stale (step 515). When an instruction is issued by the instruction scheduler 325, only the register operands with IF=0 are read, (or resent), from the VRF 310 banks for use in calculations.

In step 525, instructions, (including the instruction opcode), are sent to the instruction FIFOs 320, (e.g., InstFIFO $320_0$, InstFIFO $320_1$, . . . , InstFIFO $320_N$). For example, the instruction scheduler 325 schedules instructions of a group of threads, (i.e., a wavefront) for execution on the VALU 330 by sending the instructions to the InstFIFOs 320. Instructions for each wavefront are sent for execution in order. Additionally, all instructions from the same wavefront are sent to the same InstFIFO 320, (e.g., all instructions are sent to InstFIFO $320_0$). However, instructions from multiple wavefronts can be sent to different InstFIFOs 320. For example, an instruction from a first wavefront is sent to InstFIFO $320_0$, while an instruction from a second wavefront is sent to InstFIFO $320_1$.

In step 530, the RT block 360 is accessed, which renames destination register operands and obtains tags for source register operands. That is, in order to keep the size of each of the opCaches 315 smaller than that of the VRF banks 310, all registers that are utilized by every instruction that gets added to the instFIFOs 320 for execution are renamed. This is accomplished by the RT block 360, which checks the available pool of available tags to identify registers and renames all registers for any new instruction that is sent by scheduler 325 to any of the instFIFOs 320. If there are no free tags, the instruction issue is stalled. The RT block 360 includes a number of entries equal to the number of GPRs and is a tagless, direct mapped cache, where each entry in the cache stores a reserved operand tag. The RT block 360 is indexed by a GPR physical index. Accordingly, a GPR with an index Y reserves a new tag X from the pool when an instruction, whose destination GPR index is Y, is issued. The tag X is freed when the VRF 310 is updated with GPR Y and when all instructions, already in instFIFOs 320, that have a source operand with source GPR index of Y, are executed. The RT 360 entry indexed by the destination GPR index Y is cleared when the tag is freed.

In step 535, the opCaches 315 are updated with the operand values contained in the banks of the VRF 310 where the IF bit was set to 0, and in step 540, the InstFIFOs 320 are updated with the tags of the source operands from the RT block 360. Accordingly, the InstFIFO entry block 321 for a particular InstFIFO 320 includes the opcode for the instruction, the srcA Tag and SCB, the srcB Tag and SCB, and the srcC Tag and SCB, for any source operands the instruction might have.

Once the instructions are available for execution at one of the InstFIFOs 320, the instruction picker 316 determines whether or not the instruction is the oldest instruction in the InstFIFO 320 (step 545). For example, the instruction picker 316 examines an instruction at the top of a queue in one of the InstFIFO devices 320 for execution. As described above, instruction selection is done first by the instruction scheduler 325 in the synchronous domain, but once at one of the InstFIFOs 320, it may be placed in a queue to be selected for execution by the VALU 330 by the instruction picker 316 in the asynchronous domain. If the instruction is the oldest in the InstFIFO 320, (e.g., it is at the top of the queue), in step 545, then the method proceeds to step 550.

In step 550, it is determined whether or not the latest values of all source operands are available in the opCaches 315 to execute the instruction on the VALU 330. In order to execute an instruction on the VALU 330, the opcode for the instruction is required as well as all source operands. When an instruction is selected in the synchronous domain, (i.e., by instruction scheduler 325), source operands are read from the VRF 310 (if their latest values are available) and are written into the opCaches 315. When an instruction is selected in the asynchronous domain, (i.e., by instruction picker 316), all of its source operands are read from the opCaches 315. Alternatively, the source operands may become available by being generated during an instruction, (e.g., another instruction), being executed on the VALU 330, as is described below. Briefly, the ALU pipeline lanes generate operands whose value can be updated into the opCaches 315 to make them available. If the latest value of an operand is in a respective opCache 315, then the SCB for that operand in the instFIFO entry block 321 is set to a first value, (e.g., "1"), indicating that the operand in the opCache 315 is the latest operand available for execution in the compute pipeline. If all the source operands for the instruction to be executed on the VALU 330 include an SCB=1 and the instruction lies at the top of its instruction FIFO device 320, (i.e., is the oldest), then the instruction is ready for execution, and the method proceeds to step 555, where the instruction, along with the opcode and all source operands is sent to the VALU 330 for execution.

If it is determined in step 550 that one of the source operands for the execution of the instruction is not available, (e.g., the SCB for one or more source operands is set to a second value such as "0"), then the instruction picker 316 can select another instruction for execution. For example, the instruction picker 316 selects an instruction from another InstFIFO 320, (e.g., the instruction at the top of the queue in another InstFIFO 320). An example reason as to why this situation can occur would be that the VALU 330 is executing instructions that are generating one or more of the source operands for the instruction that has been selected by the instruction picker 316 for execution, described in further detail below. Accordingly, one of the particular opCaches 315 does not contain the most recent value, so its SCB would be set to 0.

It should also be noted that the VALU 330 has to be able to receive a new instruction for execution before one can be sent. Accordingly, the instruction picker 316 receives a completion detection signal from the VALU 330, (e.g., via the completion detection block 350), that indicates whether the VALU 330 is ready to receive a new instruction or if it is still executing a previous instruction. The instruction picker 316 does not pick a new instruction for execution until the VALU 330 notifies it that a new instruction can be executed. For example, as mentioned above, each compute pipe stage of each ALU Pipeline in the VALU 330 utilizes a handshaking protocol. Accordingly, each compute pipe stage1, for example can communicate with the completion detection block 350 to let it know that it is available to receive a new instruction.

As mentioned above, the VALU 330 generates operand values (step 560) on each ALU Pipeline. That is, as instructions are being executed, they generate operands that can be utilized by other instructions. Referring back to FIG. 2B, as each ALU Pipeline completes execution of an instruction that has been sent to it for execution, it generates a value which is first forwarded to the temporary registers block 340 for storage (step 565). Since the source operands required for execution of an instruction are vector operands, temporary values for each operand are stored in temporary registers block 340 until all the ALU Pipelines generate their values for that operand.

Since the compute pipeline, (i.e., the VALU 330), is asynchronous, each ALU pipeline lane completes its operations at a different point in time. Accordingly, the LDC block 280 is updated (step 570) by tracking the completion status of each lane for every instruction being executed. When the LDC block 280 reaches its counter limit by virtue of all ALU pipeline lanes providing a result for the executed instruction, then it notifies the instruction picker 316 to forward destination register data from a completed instruction to the appropriate opCache 315, as well as to update the appropriate opCache 315 with the destination operand value (step 580). The SCB for that operand would then be set to 1 and the VRF 310 is also updated with that operand value.

For example, in step 580, once an operand becomes available by being generated by the compute pipeline in a calculation, (i.e., by the VALU 330), it is stored in the appropriate opCache 315 entries which use the same GPR index as the source operand, (e.g., opCache $315_A$, $315_B$ or $315_C$), and the InstFIFOs 320, (i.e., InstFIFO $320_0$, InstFIFO $320_1$, . . . , InstFIFO $320_N$), are scanned to determine if any data matches a unique tag sent from the VALU 330 for the generated operand with the existing tag of the operand, (e.g. srcA, srcB, and srcC Tags) that was assigned by the RT block 360. Additionally, for any tag match, the SCB value is set to "1" for that source operand and the source operand is deemed available. Alternatively, the scanning of the instFIFOs 320 for the data match can be avoided by storing an index of the instFIFO 320 entry that uses a given operand as a source in the RAWDT 370. Then, when an operand is generated by the compute pipeline, its destination tag is sent to the RAWDT 370 and any instFIFO 320 entry index that includes that same operand as a source, is provided by the RAWDT 370, (e.g., for use by the instruction picker 316). The instFIFO 320 index is then used to access the instFIFO 320 entry block 321 and sets the SCB value to "1", instead of by scanning the InstFIFOs 320.

By utilizing an interface between synchronous logic, (i.e., the synchronous domain components) and asynchronous logic, execution latency becomes non-deterministic. That is, instructions are issued synchronously but executed asynchronously. The interface components hide the execution latency variability of the VALU from the rest of the synchronous SIMD unit. The instruction scheduler 325 issues both independent and dependent instructions at the issue rate of one per clock, (for example, to the asynchronous VALU), while data bypassing occurs asynchronously.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, graphics processor, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of asynchronous scheduling in a graphics device, comprising:
    sending one or more instructions from an instruction scheduler to one or more instruction first-in/first-out (FIFO) devices;
    selecting, by an instruction picking circuit operatively coupled to the instruction FIFO devices, an instruction stored in the one or more instruction FIFO devices for execution by a single-instruction/multiple-data (SIMD) pipeline unit as a selected instruction;
    determining whether an operand is available for use in execution by comparing a destination tag of that operand against an index for all operands to determine the FIFO device that includes that operand as a source operand and setting a score board bit for that operand to a first value indicating the operand is available for execution; and
    on a condition that all the operands are available, executing the selected instruction by the SIMD pipeline unit.

2. The method of claim 1 wherein the SIMD pipeline unit is a vector arithmetic logic unit (VALU).

3. The method of claim 1 wherein the selected instruction is an instruction at the top of one of the instruction FIFO devices.

4. The method of claim 1, further comprising receiving a computed result from the SIMD pipeline unit and storing an operand value corresponding to the computed result in an operand cache using a destination tag as an index.

5. The method of claim 4, further comprising setting a score board bit for the operand value to a first value indicating the operand is available for execution.

6. The method of claim 5, further comprising comparing a tag for the computed operand value to an existing tag for the operand in the one or more instruction FIFO devices to determine if data associated with the tag is stored in the operand cache.

7. The method of claim 1, further comprising detecting completion of instruction execution in the SIMD pipeline unit wherein the selected instruction is executed if the SIMD pipeline unit has completed execution of a previous instruction.

8. The method of claim 1 wherein instructions from a same wavefront are sent to the same instruction FIFO device.

9. The method of claim 8, further comprising issuing the instructions in the instructions from the same wavefront in the instruction FIFO device in a same order they are received by the instruction FIFO device.

10. An apparatus, comprising:
a vector register file (VRF);
one or more instruction first-in/first-out (FIFO) devices;
an instruction scheduler operatively coupled to the instruction FIFO devices;
one or more operand caches operatively coupled to the VRF;
an instruction picking circuit operatively coupled to the one or more operand caches and the one or more FIFO devices;
a lane divergence counter (LDC) operatively coupled to the instruction picking circuit; and
a single-instruction/multiple-data (SIMD) pipeline unit,
wherein the instruction scheduler sends one or more instructions to the one or more instruction FIFO devices,
wherein the instruction picking circuit selects an instruction in the one or more instruction FIFO devices for execution by the SIMD pipeline unit as a selected instruction, the LDC determines whether an operand is available for use in execution by comparing a destination tag of that operand against an index for all operands to determine the FIFO device that includes that operand as a source operand and setting a score board bit for that operand to a first value indicating the operand is available for execution, and
on a condition that all the operands are available, the SIMD pipeline unit executes the selected instruction.

11. The apparatus of claim 10 wherein the instruction picking circuit receives a completion detection signal from the SIMD pipeline unit indicating that the SIMD pipeline unit is able to receive a new instruction and wherein the selected instruction is sent for execution if the SIMD pipeline unit has completed execution of a previous instruction.

12. The apparatus of claim 10 wherein the SIMD pipeline unit operates asynchronously.

13. The apparatus of claim 10 wherein the operand caches store computed results for one or more sources and the opcode of an instruction.

14. The apparatus of claim 10 wherein each of the instruction FIFO devices stores a tag associated with an operand and a scoreboard bit indicating whether or not the operand is available for execution in the associated instruction.

15. The apparatus of claim 14 wherein if the scoreboard bits for all operands associated with an instruction are available for execution, the instruction picking circuit selects the instruction for execution on the SIMD pipeline unit when the instruction is at the top of one of the instruction FIFO devices.

16. The apparatus of claim 15 wherein the LDC tracks the completion status of each lane of the SIMD pipeline unit for every instruction being executed and notifies the instruction picking circuit to forward destination register data from a completed instruction to an associated operand cache.

17. The apparatus of claim 16, further comprising a rename table block (RT) that checks an available pool of free tags and renames all registers of any new instruction that is sent by the scheduler to any of the instruction FIFO devices.

18. The apparatus of claim 17, further comprising a read-after-write dependency table (RAWDT) block that receives a destination tag from the SIMD pipeline unit, stores an index of an instruction FIFO device entry that uses an operand as a source.

19. The apparatus of claim 10 wherein instructions from a same wavefront are sent to the same instruction FIFO device.

20. A non-transitory computer-readable medium having instructions recorded thereon, that when executed by a computing device, cause the computing device to perform operations including:
sending one or more instructions from an instruction scheduler to one or more instruction first-in/first-out (FIFO) devices;
selecting an instruction in the one or more instruction FIFO devices for execution by a single-instruction/multiple-data (SIMD) pipeline unit as a selected instruction;
determining whether an operand is available for use in execution by comparing a destination tag of that operand against an index for all operands to determine the FIFO device that includes that operand as a source operand and setting a score board bit for that operand to a first value indicating the operand is available for execution; and
on a condition that all the operands are available, executing the selected instruction on the SIMD pipeline unit.

* * * * *